United States Patent [19]
Anderson et al.

[11] Patent Number: 5,577,250
[45] Date of Patent: Nov. 19, 1996

[54] PROGRAMMING MODEL FOR A COPROCESSOR ON A COMPUTER SYSTEM

[75] Inventors: Eric C. Anderson, San Jose, Calif.; Hugh B. Svendsen, Atlanta, Ga.; A. Phillip Sohn, Campbell, Calif.

[73] Assignee: Apple Computer, Inc., Cupertino, Calif.

[21] Appl. No.: 361,842

[22] Filed: Dec. 20, 1994

Related U.S. Application Data

[63] Continuation of Ser. No. 837,326, Feb. 18, 1992.

[51] Int. Cl.[6] .............................. G06F 9/44; G06F 15/00
[52] U.S. Cl. .................................. 395/670; 364/DIG. 1; 364/221.4; 364/228.6; 364/228.1; 364/280; 364/281.3; 364/281.8
[58] Field of Search ...................................... 395/700, 650

[56] References Cited

U.S. PATENT DOCUMENTS

| | | |
|---|---|---|
| 4,648,034 | 3/1987 | Heninger . |
| 4,729,094 | 3/1988 | Zolnowsky et al. . |
| 4,787,026 | 11/1988 | Barnes et al. . |
| 4,882,674 | 11/1989 | Quint et al. . |
| 5,283,900 | 2/1994 | Frankel et al. .......................... 395/700 |
| 5,287,511 | 2/1994 | Robinson et al. ...................... 395/700 |
| 5,440,740 | 8/1995 | Chen et al. .............................. 395/650 |

OTHER PUBLICATIONS

"Support for Multiple DSP Functions a Must", K. Ulery, Electrical Engg. Times, Feb. 18, 1991.
Bindra, Ashok, "DSP Coprocessors Move to Motherboards," Electronic Engineering Times, pp. 35 and 75 (Jan. 27, 1992).
Ulery, Kerg, "Support for Multiple DSP Functions a Must," Electronic Engineering Times, p. 43 (Feb. 18, 1991).

Primary Examiner—Kevin A. Kriess
Assistant Examiner—Kakali Chaki
Attorney, Agent, or Firm—Blakely, Sokoloff, Taylor & Zafman

[57] ABSTRACT

A computer system having a processor and a coprocessor, a method and apparatus for developing and executing tasks on a coprocessor. A teamwork operating system for utilizing the coprocessor, e.g. a digital signal processor, resides in part on the processor and in part on the coprocessor. Such a teamwork operating system provides for optimum throughput of work through the coprocessor. An Application Programming Interface (API) is provided to facilitate the development of host application programs that will utilize the coprocessor. A Task Programming Interface (TPI) and a Task Unit Definition Language (TUDL) are provided to facilitate the development of coprocessor code for execution on the coprocessor.

21 Claims, 6 Drawing Sheets

PROGRAMMING MODEL FOR A COPROCESSOR ON A COMPUTER SYSTEM

This is a continuation of application Ser. No. 07/837,326, filed Feb. 18, 1992.

BACKGROUND OF THE INVENTION

1. Field of the Invention

The present invention relates to the field of computer operating systems and application development, in particular a programming model for developing host computer applications on a computer system having a coprocessor.

2. Description of the Related Art

Computer systems utilizing coprocessors for performing specialized functions or increasing processor performance and functionality, are well known in the art. Coprocessors are used for generating enhanced graphical images and performing arithmetic functions. As multimedia applications are being developed for computer systems, the desire and need for digital signal processing (DSP) coprocessors has emerged. Mulitmedia applications refer to applications which integrate different forms of communication to create a more effective presentation of information, e.g. a "document" that has text, video and audio portions.

Digital signal processing is the processing of digitized signals. Digitized signals are digital representations of analog signals. Analog signals may be sounds, images, speech or any one or more ensembles of one or more series with a dependent variable (e.g. time or space). To correctly process such digitized signals, it is necessary to know at what sample rate the signal was digitized and the format of the digital bits used to represent the analog signal. With this information, the digitized signal can be manipulated by application software programs. The resulting data can then be stored or converted back into an analog signal. An application program that utilizes a DSP coprocessor is hereinafter referred to as a host DSP application, while the code that is actually executing on the DSP is referred to as a DSP program. For example, a host DSP application may be a program to create and edit music, while a DSP program may be used for compressing, decompressing and mixing stored audio data for playback.

In some instances, host DSP applications are supported via dedicated hardware components, e.g. a modem or audio interface or a graphical display interface. It is desirable to have a single DSP coprocessor support multiple applications for inherent economies, e.g. reduced system hardware costs. With the growth of multimedia applications, such digital signal application requirements will grow accordingly.

The integration of a coprocessor into a computer system will typically take one of three forms: shared command stream, multi-processing and satellite. In a shared command stream integration, coprocessor task requests are placed directly into an input stream processed by the host processor. The way the coprocessor receives the tasks may be in one of two manners. In a first manner, the coprocessor tasks are forwarded by the host processor to the coprocessor for execution. In a second manner, the coprocessor monitors bus activity looking for coprocessor instructions. Upon detection of a coprocessor instruction, the coprocessor communicates with the host processor, e.g. via a hardware handshake, and processes the instruction. A coprocessor for carrying out mathematical equations, such as a floating point processor, will typically have a shared command stream integration.

In a multi-processing integration, the coprocessor has it's own operating system. Communication with the host processor operating system is through shared memory, hardware mailboxes or other resources. In a satellite integration, the coprocessor may receive commands, programs and data from a host processor for carrying out tasks. Typically, a coprocessor shares an I/O channel or other limited interconnection means, rather than sharing memory through a common bus.

For each of the aforementioned integration techniques, the question of optimizing usage of the host processor and coprocessor resources arises. In a shared command stream or command driven integration, the coprocessor remains idle during periods of time when no tasks are being directed to it, but may become a source of a processing bottleneck during periods of heavy usage. In a multiprocessor integration, functions that may be best carried out by the host processor may be performed by the coprocessor, thus negatively impacting total system performance. It is desirable to have synergistic operation of the host processor with the coprocessor.

Known DSP implementations integrate the DSP coprocessor as a satellite coprocessor to the main processor. Such implementations have proven to limit DSP functionality and the end value of the DSP itself, to the customer. DSP coprocessors typically have a dedicated operating system. This has resulted in requiring a programmer developing a host DSP application or a DSP program to be familiar with the host computer system operating environment, the DSP operating environment and programming techniques or algorithms specific to the type of data (e.g. digitized audio data) being manipulated. In many cases this is inefficient because a single programmer would not have such skills and would have to acquire them. For example, a programmer developing a host DSP application may not have any skills in the DSP operating environment or in the algorithms used for manipulating a specific type of data. Conversely, a programmer developing a DSP program may not have any skills regarding the host operating environment.

A known technique for simplifying host application development utilizing a provided system resource is through an Application Programming Interface (API). An API is typically a predefined set of function (e.g. macro) calls which can be used to access and utilize the resource in a predefined manner. However, such APIs do not address the situation wherein a host application developer requires flexibility in the manner in which they utilize a resource. If a host application developer desired to use the resource in an alternative manner, the API would typically be bypassed thus requiring skills in programming the resource.

It is an object of the present invention to provide an environment wherein application and coprocessor programmer skills are best utilized. To this end, an environment where an host DSP application developer need not be concerned about programming a DSP, and a DSP program developer need not be concerned about programming the host environment, is desirable.

It is a further object of the present invention to optimize total system throughput through the division of labor between a host processor and a coprocessor.

Finally, it is an object of the present invention to provide for the simultaneous servicing of multiple host applications through one or more coprocessors.

SUMMARY

A method and apparatus for developing and executing tasks on a coprocessor, e.g. a digital signal processor, is disclosed. An operating system for the coprocessor utilizes a teamwork concept. The teamwork concept divides coprocessor operating system function between the host processor and the coprocessor. Thus, a first portion of the coprocessor operating system is executed by the host processor and a second portion is executed by the coprocessor. Such a teamwork operating system optimizes system and coprocessor throughput of work.

Further, an Application Programming Interface (API) is provided to facilitate the development of host application programs that will utilize the coprocessor. The API is comprised of a set of function calls which are used to create and control coprocessor tasks. A Task Programming Interface (TPI) and Task Unit Definition Language (TUDL) are provided to facilitate the development of coprocessor code for execution on the coprocessor. The TPI and TUDL comprise a set of function calls and macros which are used to facilitate the construction of the operating environment for coprocessor programs. Communication between a host application developer and a coprocessor program developer is provided through a task unit specification document. The task unit specification document contains the necessary information for a host application to utilize a particular coprocessor program.

DETAILED DESCRIPTION OF THE PREFERRED EMBODIMENT

A method and apparatus for controlling a coprocessor, namely a digital signal processor in a computer system, is described. In the following description, numerous specific details are set forth such as operating system functionality, in order to provide a thorough understanding of the present invention. It will be apparent, however, to one skilled in the art that such detail is known to those skilled in the art and that the present invention may be practiced without these specific details. In other instances, well-known functions e.g. digital system processing algorithms and functions, have not been described in detail in order not to unnecessarily obscure the present invention.

OVERVIEW OF A COMPUTER SYSTEM IN THE PREFERRED EMBODIMENT

Figure 1:
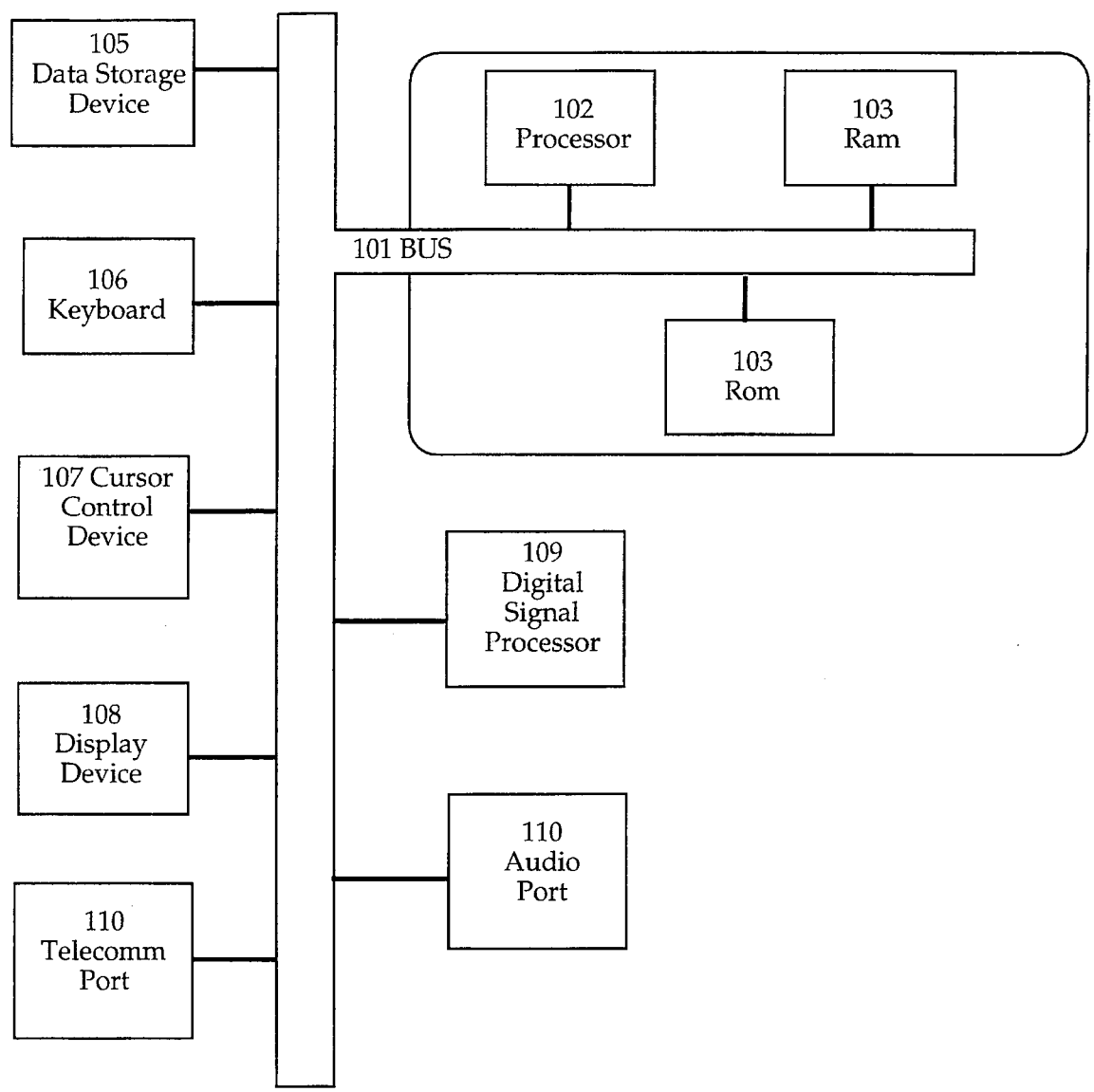
FIG. 1 illustrates a computer system as may be utilized by the preferred embodiment of the present invention.

The preferred embodiment of the present invention may be practiced on computer systems having alternative configurations. FIG. 1 illustrates some of the basic components of such a computer system, but is not meant to be limiting to exclude other components or combinations of components. In any event, the computer system illustrated in FIG. 1 comprises a bus or other communication means 101 for communicating information, a processing means 102 (commonly referred to as a host processor) coupled with the bus 101 for processing information, a random access memory (RAM) or other storage device 103 (commonly referred to as a main memory) coupled with the bus 101 for storing information and instructions for the processor 102, a read only memory (ROM) or other static storage device 104 coupled with the bus 101 for storing static information and instructions for the processor 102.

Other devices coupled to said bus 101 include a data storage device 105, such as a magnetic disk and disk drive for storing information and instructions, an alphanumeric input device 106 including alphanumeric and other keys for communicating information and command selections to the processor 102, a cursor control device 107, such as a mouse, track-ball, cursor control keys, etc, for controlling a cursor and communicating information and command selections to the processor 102, a display device 108 for displaying data input and output, a digital signal processor (DSP) 109 for processing DSP resource requests, an audio port 110 for input and output of audio signals and a telecommunications port 111 for input and output of telecommunication signals. In such a computer system configuration, the digital signal processor 109 is considered a coprocessor to the host processor 102.

Architecturally, a DSP is very fast integer RISC (Reduced Instruction Set Computer) based general purpose microprocessor which includes a floating point unit. A fundamental difference from true general purpose processors, is that a DSP is designed to perform a Multiply and Accumulate (MAC) operation very quickly. The MAC operation is very heavily used in DSP programs. Thus, it should be noted that DSP host applications may be written that do not require a DSP coprocessor for execution, but would exploit them if available.

An embodiment of the present invention is implemented for use on some of the members of the family of Macintosh® computers, available from Apple® Computer, Incorporated of Cupertino, Calif. A coprocessor that may be utilized is any digital signal processing processor having operating characteristics and functions similar to those found in the DSP3210 Digital Signal Processor, available from American Telephone & Telegraph (AT&T) Microelectronics of Allentown, Pa.

The remainder of the description will be in reference to the implemented embodiment. As the DSP coprocessor in the implemented embodiment has the characteristics of a general purpose microprocessor, it would be apparent to one skilled in the art to apply the present invention to coprocessors performing various other functions.

Further, as will become apparent in the foregoing description, the preferred embodiment of the present invention is independent of the DSP used, as hardware specific requirements are compartmentalized. Thus, the use of an alternative DSP would simply require the development of DSP drivers. As the essential components of the DSP Kernel that execute on the DSP coprocessor are relatively small and well known, this represents a well known activity. Of course any DSP program code written to utilize a specific DSP device would have to be rewritten or re-compiled.

As described above a DSP coprocessor has characteristics of a general purpose processor. This includes access to local memory, sometimes analogous to system memory, and be controlled by an operating system. For example, the DSP3210 DSP coprocessor has an 8 kilobyte internal cache memory and a general purpose external bus for access to system memory. From the DSP programmer's viewpoint the DSP is a self-contained system that is operating in unison with the host processor and the host operating system. However, from the host application programmer's viewpoint, the DSP is a simply a resource which my be called upon using conventional programming techniques associated with the host computer system.

SYSTEM ARCHITECTURE

The implemented embodiment utilizes a shared-memory architecture, which enables the host processor and the DSP to have access to system resources. The shared-memory architecture has shown to have the benefits of: reducing implementation and hardware costs, simplifying and speeding up inter-processor communications and data sharing or data streaming, optimizing system throughput and increasing the range of possible applicable functions the DSP can provide.

A memory model within the implemented embodiment is divided into local memory and main memory. Local memory contains data that is frequently accessed by the DSP operating software (e.g. program data). Main memory contains less frequently accessed data (e.g. FIFO data). Note that both local and main memory may be in the same physical memory or separated by a bus. They both share a common address space.

The system provides DSP robustness in that it allows multiple concurrent DSP coprocessor operation, each of which may be simultaneously accessed by multiple DSP clients (DSP clients are described in more detail below). Such DSP robustness will become apparent within the foregoing description.

Figure 2:
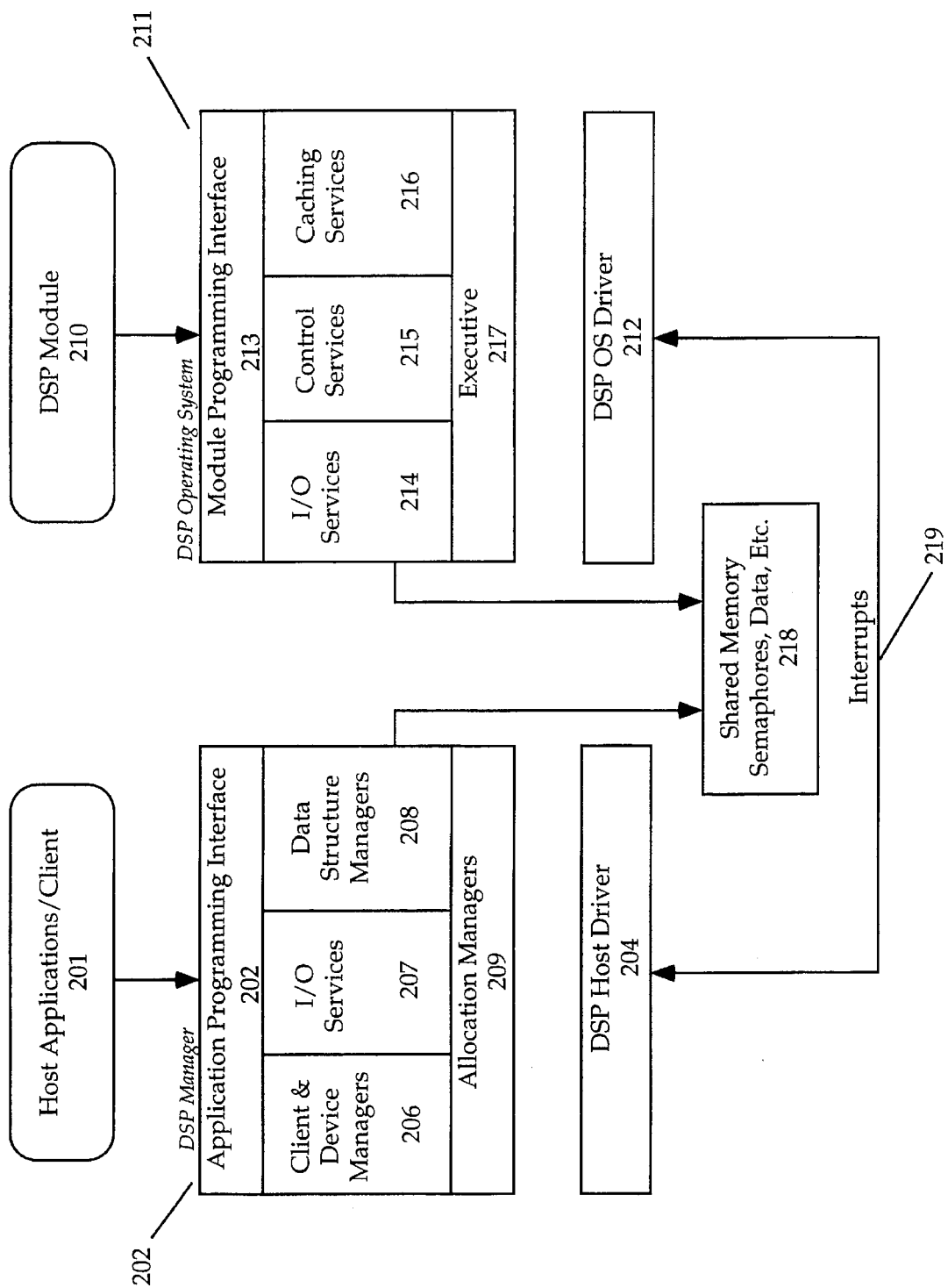
FIG. 2 illustrates a teamwork processing operating environment as utilized by the preferred embodiment of the present invention.

The DSP or coprocessor operating system of the implemented embodiment works on a team processing basis. In particular, careful attention is paid to the division of labor between the host processor and the DSP. The objective is to make best and maximum use of all computer system resources. The overall DSP Operating System architecture is illustrated in FIG. 2. FIG. 2 provides a view of the functions of the system architecture and is not intended to represent any actual organization or interface within functional components.

Referring to FIG. 2, Host Application(s) or Client(s) 201 interfaces with a DSP Manager 202. The DSP Manager 202 may be conceptually thought of as a first level toolbox accessible by application programmers. The DSP Manager 202 executes on the host processor. The Host Application or Client 201 represents either a specific application or a higher level toolbox that is being accessed by a host application. The term client is commonly used to describe a relationship between a resource and a resource requestor. In this case the resource being requested is the DSP coprocessor. A toolbox refers to a predefined set of callable routines that carry out commonly used functions. Typically such toolboxes are associated with a particular function, e.g. generating graphical output. The use of toolboxes is well known to those familiar with programming in the Apple operating system environment and is described in detail in the publication "Inside Macintosh" published by ADDISON-WELSLEY Publishing Company. This further implies that a host application may make use of the DSP functionality either directly through the DSP Manager 202 or through a higher level toolbox.

The DSP Manager 202 provides the host functionality through which host DSP applications and higher level toolboxes access DSP function. The DSP Manager 202 further interfaces with a DSP Host Driver 204. The DSP Host Driver 204 executes on the host processor and provides specific functionality required to interface with a particular DSP coprocessor hardware implementation. The DSP Manager 202 and DSP Host Driver further interface with a Shared Memory 218. The Shared Memory 218 may be defined as either local memory or as a combination of both local and main memory. The local memory is either in system DRAM or in an optional card or main logic board memory. It is through this Shared Memory 218 that the DSP Manager 202 and a DSP Kernel 211 communicate.

The DSP Manager 202 is further comprised of an Application Programming Interface (API) 205, client and device mangers 206, I/O services 207, data structure managers 208, and allocation managers 209. The DSP Manager 202 may utilize a standard interface used for making toolbox calls. For example, in the Apple Macintosh environment, a standard trap interface is used for making toolbox calls. However, a procedure call mechanism would also work. A set of macros for interfacing to the DSP are accessible to the client(s) and are defined and interpreted within the Application Programming Interface (API) 205. Note that a macro in this context refers to a callable portion of code that will perform a predetermined function. Macros and their use are known to those skilled in the art.

The three major services of the DSP Manager are related to I/O services 207, client and device management 206, and data structure management 208. These services make calls on allocation managers that the are lowest level of the DSP Manager 202. The allocation managers 209 are responsible for DSP cache and local memory allocation, and for I/O resource allocation. I/O services 207 are for handling data streams being sent to or received from the DSP in real time. Client and device managers 206 are responsible for keeping track of available devices (i.e. both processing and I/O resources) and clients. Client management allows for multiple clients to share the available resources without conflicts.

The above-described components 201–209 are all associated with the host processor. The foregoing items will be primarily executing on the host processor. Referring back to FIG. 2, a Task Definition Language (TUDL) 220 is used to construct a DSP Task Unit 210. The TUDL 220 provides a set of macros for constructing a DSP Task Unit which are further used to facilitate the construction of a DSP Task. The TUDL 210 further provides generic information for utilizing the DSP Task Unit in various configurations. This generic information is used by the DSP Manager 202 to create the desired DSP Task. The TUDL macros execute on the host processor but may cause routines to execute on the DSP coprocessor.

The TUDL macros eliminate the need for DSP programmers to include low level, e.g. memory management, DSP operating instructions in their programs. It should be noted that the TUDL macros may further be stored in sets and invoked as TUDL scripts. Such scripts may be used to perform often used TUDL functionality.

A DSP Task 221 interfaces to the DSP Kernel 211. The DSP Task 221 represents a particular function or program that has been written for the DSP coprocessor. The DSP Task 221 is discussed in greater detail below. The DSP Kernel 211 resides in a storage location directly accessible by the DSP coprocessor (e.g. local memory). In the implemented embodiment, such storage locations are within local memory and the cache and/or Read Only Memory (ROM) of the DSP3210 DSP coprocessor.

In an analogous fashion to the DSP Manager 202, the DSP Kernel 211 interfaces to a DSP Kernel Driver 212 and Shared Memory 218. The DSP Kernel Driver 212 contains hardware dependant routines and resides in local or cache memory. The DSP Kernel Driver 212 communicates to the DSP Host Driver 204 via the Shared Memory 218 and through direct interrupts 219. Communication between the DSP Manager 202 and the DSP Kernel 211 is provided for by flags, data and semaphores in the Shared Memory 218 and by the interrupts 219. The DSP Kernel 211 is further comprised of Task Programming Interface (TPI) 213, I/O services 214, control services 215, caching services 216, and executive 217.

Like the DSP Manager 202, the DSP Kernel 211 also has an interface layer, namely the Task Programming Interface (TPI) 213. The TPI 213 provides directives to the DSP Kernel 211 for constructing the run time environment for the DSP Task. The TPI 213 may work in a similar fashion as the DSP Manager: a trap or procedure call mechanism is used to make calls on the DSP Kernel from the DSP Task Unit. The TPI 213 executes on the DSP coprocessor but may cause routines to execute on the host processor.

The DSP Kernel 211 also provides services to a DSP Task, namely I/O services 214 including data stream and FIFO management to other tasks or processors, control services 215, and caching operations 216 for DSP cache memory. The underlying function of the DSP Kernel is an executive layer 217, which is responsible for managing DSP Task sequencing and other control functions.

As noted above, communication between the DSP Manager 202 and the DSP Kernel 211 transmitted through the Shared Memory 218 and may be initiated by interrupts 219 or by flags or semaphores. The DSP Host Driver 204 executes on the host processor while the DSP Kernel Driver 212 executes on the DSP coprocessor.

An example of communication required between the DSP Manager 202 and the DSP Kernel 211 may result from the abnormal termination of a task executing on the DSP. In such a situation the Host Application/Client and operating system must be informed of the termination. Accordingly, the DSP Kernel 211 would cause the DSP Driver 212 to generate an interrupt to the DSP Host Driver 204. Further, the DSP Kernel 212 would place status/error information in a predetermined location or buffer in Shared Memory 218. Upon receipt of the interrupt, the Host Driver 204 would interrogate the predetermined location or buffer in Shared Memory in order to carry out a desired responsive action. This may include callbacks to the DSP Manager 202 and/or Host Application/Client 201.

In the implemented embodiment, the DSP Kernel Driver 212 and the DSP Host Driver 204 are stored together as one driver. The DSP Host Driver 204 would conform to standard device driver requirements associated with the host operating system. The DSP Kernel Driver 212 performs a similar driver function for the DSP coprocessor. Further, it would contain any DSP code that is hardware implementation dependent, as well as booting, restart and error handling code.

FIG. 2 further illustrates the dual programming interface of the implemented embodiment: the applications programming interface (API) 205 in the DSP Manager, the Task Programming Interface (TPI) 213 in the DSP Kernel 211 and Task Unit Definition Language (TUDL) 220. These interfaces are completely separate and designed to be used by different programmers. Specifically, it is not necessary for a programmer to have skills in both host application and DSP programming. The programmers may communicate with each other through a DSP Task Unit Specification document. This document provides a vehicle for transferring all the information necessary to ensure a correct interface between the host client and a DSP Task Unit. The contents of a DSP Task Unit Specification document will be discussed below in more detail.

Host DSP Application Development

When a host application program utilizes a DSP coprocessor, a DSP Task is constructed. A DSP Task may be built by the host application programmer within the context of the application that is utilizing the DSP. A DSP Task may also be built by a tool in a toolbox. In any event, a task is built by making macro calls to the DSP Manager via the Application Programming Interface (API). Using these macro calls, a task structure is created and a desired DSP Task Unit inserted into the task structure. Other macro calls are used to activate, query status and deactivate a DSP Task.

The task structure is typically comprised of a task identifier, associated flags, and a pointer to a linked list of DSP Task Units. DSP Task Units comprise the DSP code, variables, input buffer, output buffer or other information for creating the DSP Task which is executed on the DSP coprocessor.

As described above, host applications may typically use tools from a toolbox. The writing of host applications to use a toolbox and for the creation or extension of a toolbox, in the implemented embodiment is described in the aforementioned "Inside Macintosh" publication. Thus, no further discussion of using a toolbox is deemed necessary.

In the implemented embodiment, a host DSP application or client can be designed to operate in three different ways: 1) recognize and use the DSP if it is there, for enhanced performance of specific application functions, 2) require the DSP, and not run at all if no DSP is available or 3) utilizing the DSP by making calls to a higher level toolbox.

Figure 3:
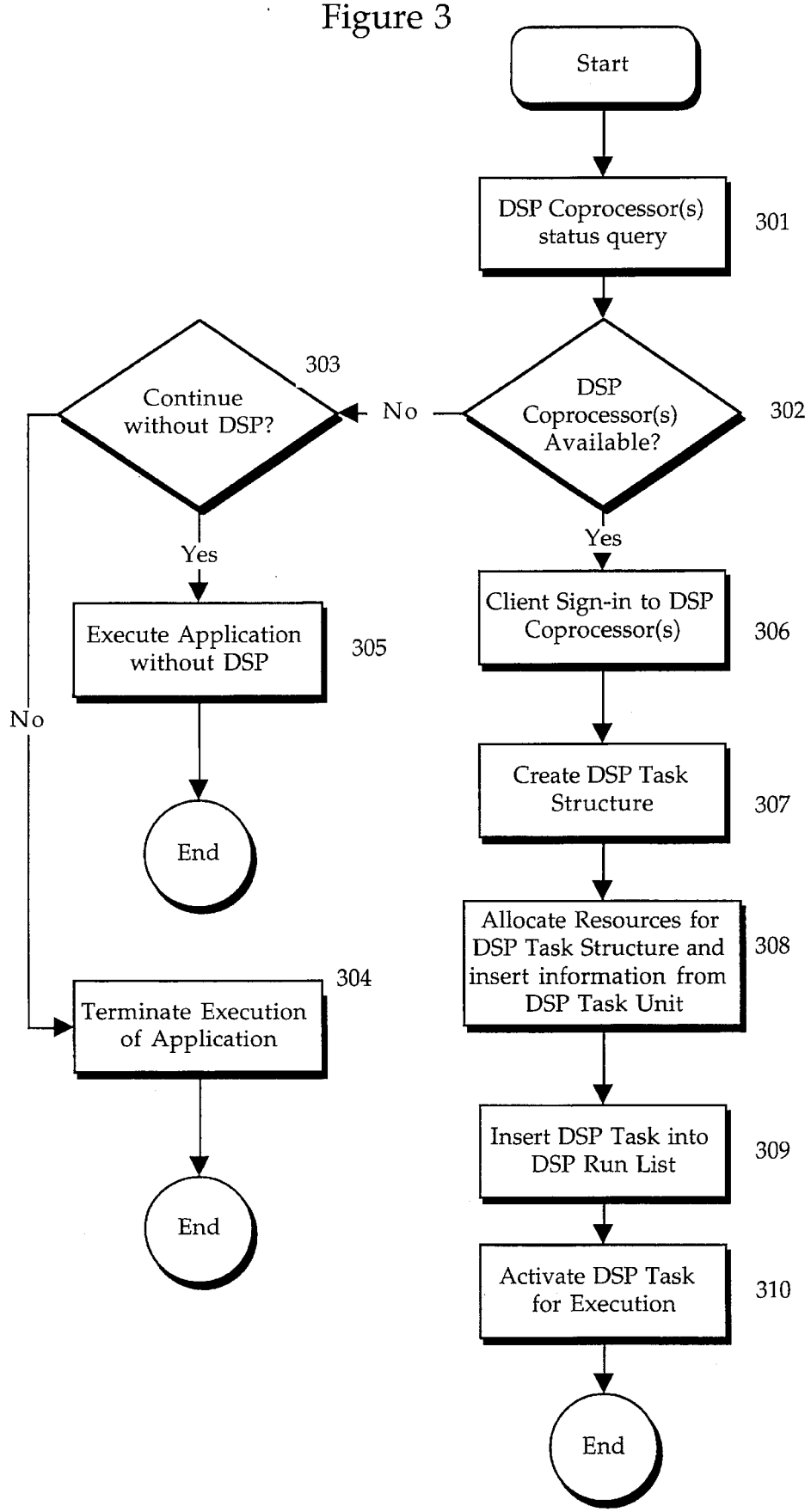
FIG. 3 is a flowchart illustrating the steps required for constructing a coprocessor task that will utilize the coprocessor as performed in an implemented embodiment of the present invention.

FIG. 3 is a flowchart illustrating the steps required for constructing a DSP Task. First, a DSP client (e.g. the host application) must establish the existence of a DSP via a DSP query status, step 301. It is then determined if a DSP resource is available, step 302. This test is made because for platform independence of applications. Thus, the application may exploit the DSP coprocessor if it exists and could decide whether or not to continue processing if it does not exist. If the DSP resource is not available, a decision is made as to continuing the application, step 303. If the application will not execute without the DSP, it is terminated, step 304. Otherwise, the application continues wherein the DSP functionality is performed, potential at a reduced level, by the host processor, step 305.

If the DSP resource is available, the client will sign-in with the DSP device(s), step 306. This procedure allows a given task to be associated with a particular client. This is done for client management, error handling and controlling DSP Task access.

Next, a new (empty) DSP Task structure is created, step 307. This involves the allocation of memory for storing the task data structure. Resources from DSP Task Units are then allocated and inserted into the DSP Task structure from storage, step 308. Information stored in the Task Unit from the TUDL is used in conjunction with application directives via the API to construct the DSP Task. Information concerning the DSP Task Units are provided to the host programmer from the DSP Task Unit Specification Document. Once DSP Task Unit insertion is completed, the DSP Task is then placed into a DSP Task run list for execution by the DSP coprocessor, step 309. When the DSP Task is inserted into the DSP Task run list, it is inactive, i.e. it is not flagged for execution. The DSP Task is then activated for execution, step 310. This would involve setting an active/inactive control flag associated with the task.

Figure 4:
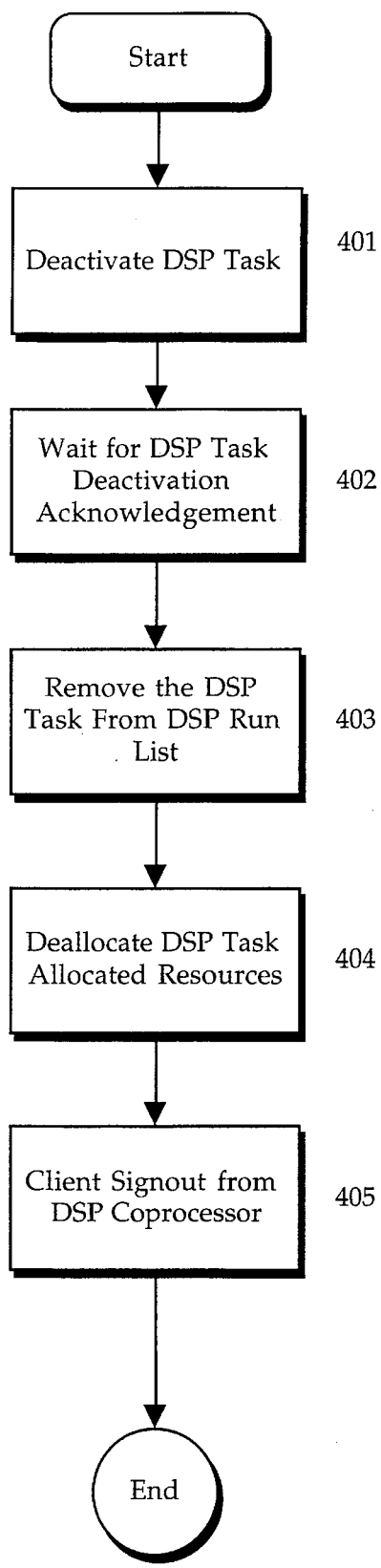
FIG. 4 is a flowchart illustrating the steps required for removing a coprocessor task from execution on a coprocessor as performed in an implemented embodiment of the present invention.

Further API macros are provided within the preferred embodiment to query the status of, control, modify or terminate a task. FIG. 4 is a flowchart outlining the steps required for terminating a task. Special steps are required for terminating a task due to the storage allocations made for storing the various buffers and other storage media used during the execution of the task. First, the task is deactivated, step 401. This will typically involve clearing the active/inactive control flag for the DSP Task. A deactivation acknowledgement is then queried, step 402. The host processor must wait for verification of completion of a task that may be currently executing. This will prevent removal of a DSP Task that is still executing (which may cause the entire system to abnormally terminate). Next, the DSP Task is removed from the DSP Task run list, step 403. All task allocated resources are then deallocated, step 404. This would include memory allocated for the task structure itself and for local and system memory allocated for the DSP Task and data or I/O buffers. Finally, the client must sign-out from the DSP coprocessor, step 405.

DSP Application Development

DSP Task Units isolate DSP programming from host application programming. However, DSP Task Units are installed by the host application as described above. Therefore, DSP programmers must document some basic information about each program unit. Such information would be included in a DSP Task Unit Specification Document. With such a DSP Task Unit Specification Document, the host application programmer would have the required information for writing a host application. The basic information would include task unit identifier information, I/O buffer definition information and control and parameter format and function and a brief description of the functions provided by the DSP Task Unit.

The development of the actual DSP program code may be distinct from the construction of a DSP Task Unit. The DSP program code is comprised of instructions specific to the DSP. The implemented embodiment of the present invention does provide development facilities, e.g. compilers, assemblers and debuggers, for coding DSP programs. Such program development facilities are known in the art.

Figure 5:
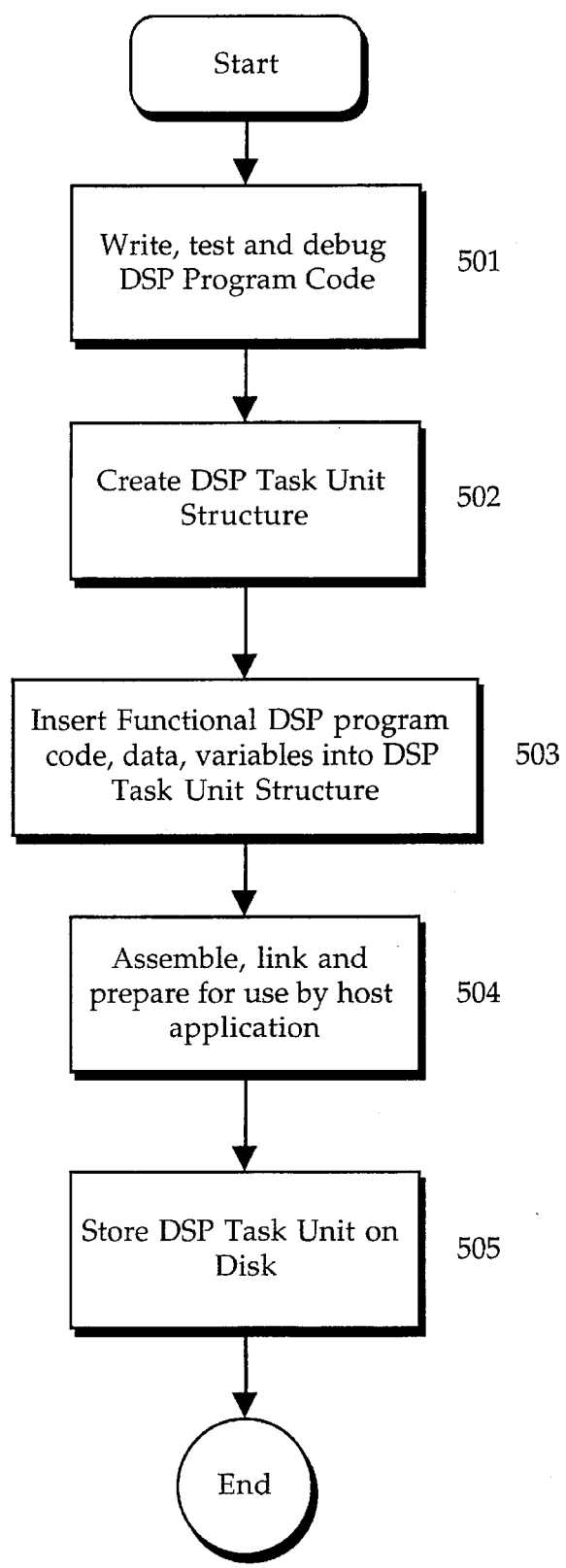
FIG. 5 is a flowchart illustrating the steps required for creating a coprocessor task unit for execution on a coprocessor, as utilized in an performed embodiment of the present invention.

FIG. 5 is a flowchart exemplifying steps required for DSP Task Unit creation. Other or different steps may be taken depending on an individual programming style, programming methodology or the operation of a particular development toolset. In any event, the creation of a DSP Task Unit starts with the development (i.e. writing and debugging) of a desired DSP program, step 501. It is understood that the DSP program would be designed with respect to the underlying constructs of DSP Task Unit and the macros provided in the TPI and TUDL. The remainder of the steps regard actual construction of a Task Unit structure and are implemented using TPI and TUDL calls and macros. First, a new Task Unit structure is created, step 502. This will result in the allocation of memory for the program unit structure and insertion of information into the header field. The DSP program code, data, variables, etc. are inserted into the DSP Task Unit structure, step 503. Next, the DSP Task Unit is prepared for used by a DSP Host Application or Client by compiling, and/or assembling and linking, step 504. Finally, the constructed Task Unit is placed in storage, e.g. a disk, step 505. It is from the disk storage location that the Task Unit is accessible by the host application programmer.

Example of DSP Host Application

Figure 6:
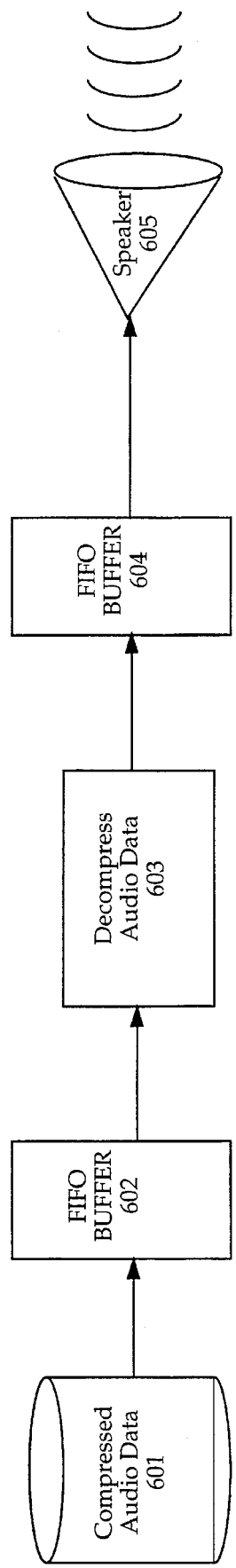
FIGS. 6 outlines an example of a host application utilizing a DSP coprocessor as may be performed by an implemented embodiment of the present invention.

FIG. 6 illustrates a host DSP application. The DSP application will take previously stored audio data and play it back. Compressed audio data is stored on a disk 601. Such compression of the audio data itself would comprise a DSP Task. In any event, the compressed audio data 601 would be provided to an input FIFO buffer 602. The input FIFO 602 would be further coupled to a DSP Task 603 for decompressing the audio data. The output, i.e. the decompressed audio data, would then be fed into a second FIFO buffer 604. The FIFO 604 would then coupled to speaker 605 for playback of the audio data.

In this example, the decompress audio data DSP Task Unit 603 would be created using the method described with respect to Task Unit creation. The elements surrounding the DSP Task Unit 603, namely the compressed audio data 601 and FIFOs 602 and 604 would be defined and associated to DSP Task 603 by the host application or client using a series of API calls to both the DSP Manager and other host operating system toolboxes. Thus, the decompression algorithm program code is developed separately from the audio playback Task Unit code.

Thus, a method and apparatus utilizing a teamwork operating environment and which provides for separate programming interfaces for host application developers and coprocessor program developers, is disclosed.

We claim:

1. A computer system comprising:
   a) a memory containing an application program and a coprocessor operating system, wherein the coprocessor operating system includes a host portion and a coprocessor portion, wherein said host portion provides a plurality of macros for constructing coprocessor tasks;
   b) a storage device containing a plurality of coprocessor task units;
   c) a processor coupled to said memory and said storage device, wherein said processor is configured to execute said application program and said host portion, wherein execution of said application program causes said processor to execute said plurality of macros, wherein execution of said plurality of macros causes said processor to construct a plurality of coprocessor tasks, wherein each coprocessor task of said plurality of coprocessor tasks includes information inserted from at least one coprocessor task unit of said plurality of coprocessor task units, wherein execution of said macros further causes said processor to insert said plurality of coprocessor tasks into a run list; and
   d) a coprocessor coupled to said memory and said storage device, said coprocessor being configured to execute said coprocessor portion, wherein execution of said coprocessor portion causes said coprocessor to sequentially execute said plurality of coprocessor tasks in said run list.

2. The computer system as recited in claim 1 wherein each coprocessor task unit of said plurality of coprocessor task units is comprised of:
   a) a header portion for identifying said coprocessor task unit;
   b) coprocessor data and instructions;
   c) input/output information; and d) requirements information for building an execution environment for said coprocessor task unit.

3. The computer system as recited in claim 2 wherein each coprocessor task of said plurality of coprocessor tasks is comprised of:

a) a header portion for identifying said coprocessor task;

b) coprocessor data and instructions;

c) input/output, status and control information, wherein said input/output, status and control information is generated from said requirements information of said coprocessor task unit.

4. The computer system as recited in claim 1 wherein the coprocessor portion is comprised of:

a) a task programming interface portion, said task programming interface portion comprised of a plurality of coprocessor directive macros stored on said storage device;

b) a task unit definition portion, said task unit definition portion comprised of a plurality of task unit construction macros stored on said storage device; and c) a coprocessor driver portion, the coprocessor executing said coprocessor driver portion to interface with said processor.

5. The computer system as recited in claim 3 wherein said host portion is further comprised of:

a) a host application interface portion, said host application interface portion being comprised of a plurality of coprocessor task creation and control macros stored on said storage device; and b) a host driver portion, the processor executing said host driver portion to interface with said coprocessor.

6. The computer system as recited in claim 5 further comprising a plurality of interrupt lines coupled to said processor and said coprocessor, wherein execution of said host driver portion causes said processor to generate message signals over said interrupt lines to said coprocessor, wherein execution of said coprocessor driver portion causes said coprocessor to generating message signals over said plurality of interrupt lines to said processor.

7. The computer system as recited in claim 1 wherein said coprocessor is a Reduced Instruction Set Computer (RISC) processor.

8. The computer system as recited in claim 1 wherein said coprocessor is a Digital Signal Processing (DSP) processor.

9. A method for utilizing a coprocessor in a computer system comprising a processor, said coprocessor, a memory connected to the processor and the coprocessor, said coprocessor having an operating system, said method comprising the steps of:

a) providing a coprocessor task unit to said processor, said coprocessor task unit including a set of coprocessor instructions and data, coprocessor task building information and coprocessor directives;

b) executing a host portion of said operating system on said processor, wherein execution of said host portion causes said processor to perform the steps of b1) constructing a coprocessor task from said coprocessor task unit, said coprocessor task including said set of coprocessor instructions, and b2) providing said coprocessor task to said coprocessor for execution; and c) executing a coprocessor portion of said operating system on said coprocessor, wherein execution of said coprocessor portion causes said coprocessor to perform the step of c1) executing said set of coprocessor instructions contained in said coprocessor task.

10. The method as recited in claim 9 wherein said step of constructing a coprocessor task from said coprocessor task unit is further comprised of the steps of:

a) creating a coprocessor task structure;

b) generating input/output, status and control information from said coprocessor task building information of said coprocessor task unit;

c) inserting said input/output, status and control information into said coprocessor task structure; and d) inserting said set of coprocessor instructions and data into said coprocessor task structure.

11. The method as recited in claim 9 wherein said step of providing said coprocessor task to said coprocessor for execution is further comprised of the steps of:

a) inserting said coprocessor task into a coprocessor run list; and b) activating said coprocessor task.

12. The method as recited in claim 9 wherein said step of executing said coprocessor task is further comprised of the steps of:

a) providing said coprocessor task to said coprocessor portion of said operating system;

b) building a run time environment for said set of coprocessor instructions from said coprocessor directives of said coprocessor task unit; and c) executing said set of coprocessor instructions.

13. The method as recited in claim 9 wherein said coprocessor is a Reduced Instruction Set Computer (RISC) processor, wherein said step of executing said set of coprocessor instructions is performed by executing said set of coprocessor instructions on said Reduced Instruction Set Computer processor.

14. The method as recited in claim 9 wherein said coprocessor is a Digital Signal Processing (DSP) processor, wherein said step of executing said set of coprocessor instructions is performed by executing said set of coprocessor instructions on said Digital Signal Processing processor.

15. In a computer system comprising a processor, a coprocessor, and a memory coupled to said processor and said coprocessor, wherein said computer system operation is controlled by an operating system, wherein said coprocessor operation is controlled by a coprocessor operating system, a method for preparing tasks for said coprocessor comprising the steps of:

a) executing a plurality of task definition language macros on said processor, wherein execution of said plurality of task definition language macros causes said processor to create a coprocessor task unit, said coprocessor task unit having one or more coprocessor instructions that are executable on said coprocessor;

b) executing an application program on said processor, wherein execution of said application program causes said processor to execute macros in a host portion of said coprocessor operating system, wherein execution of said macros in said host portion causes said processor to perform the steps of b1) constructing a coprocessor task for executing said coprocessor task unit, said coprocessor task including said one or more coprocessor instructions;

b2) inserting said coprocessor task into a coprocessor task run list; and b3) activating said coprocessor task in said coprocessor task run list for execution.

16. The method as recited in claim 15 wherein execution of said plurality of task definition language macros causes said processor to create said coprocessor task unit by causing said processor to perform the steps of:
   a) generating a set of coprocessor instructions for carrying out a desired function;
   b) creating a task unit structure; and
   c) inserting into said task unit structure input/output, variable and data information for said set of coprocessor instructions.

17. The method as recited in claim 16 wherein said step of constructing said coprocessor task is further comprised of the steps of:
   a) creating a coprocessor task structure; and
   b) inserting information from said coprocessor task unit into said coprocessor task structure.

18. The method as recited in claim 16 wherein said step of generating a set of coprocessor instructions is performed by generating a set of coprocessor instructions executable on a Reduced Instruction Set Computer (RISC) processor.

19. The method as recited in claim 16 wherein said step of generating a set of coprocessor instructions is performed by generating a set of coprocessor instructions executable on a Digital Signal Processing (DSP) processor.

20. The method as recited in claim 15 further comprising the step of executing a coprocessor portion of said coprocessor operating system on said coprocessor, wherein execution of said coprocessor portion causes said coprocessor to execute any active tasks in said coprocessor task run list, including said coprocessor task.

21. A method for servicing a request to perform a function in a computer system, wherein the computer system includes a processor, the method comprising the steps of:
   a) causing a said processor to determine whether a coprocessor is present in said computer system;
   b) if a coprocessor is not present in said computer system, then causing said processor to perform said function;
   c) if a coprocessor is present in said computer system, then
      c1) causing a processor to execute macros in a host portion of a coprocessor operating system, wherein execution of said macros in said host portion causes said processor to perform the steps of
         i) constructing a coprocessor task for executing said function, said coprocessor task including said one or more coprocessor instructions;
         ii) inserting said coprocessor task into a coprocessor task run list; and
         iii) activating said coprocessor task in said coprocessor task run list for execution; and
      c2) executing a coprocessor portion of said coprocessor operating system on said coprocessor, wherein execution of said coprocessor portion causes said coprocessor to execute any active tasks in said coprocessor task run list, including said coprocessor task.

* * * * *